(12) United States Patent
Keener

(10) Patent No.: US 7,489,484 B2
(45) Date of Patent: Feb. 10, 2009

(54) PROTECTIVE DEVICE FOR A CONTROLLING SYSTEM OF A SEWAGE PUMP

(76) Inventor: Robert M. Keener, 1186 State Rte. 511 North, Ashland, OH (US) 44805

( * ) Notice: Subject to any disclaimer, the term of this patent is extended or adjusted under 35 U.S.C. 154(b) by 220 days.

(21) Appl. No.: 11/619,361

(22) Filed: Jan. 3, 2007

(65) Prior Publication Data
US 2008/0158743 A1 Jul. 3, 2008

(51) Int. Cl.
*H02H 7/08* (2006.01)
(52) U.S. Cl. ............ 361/28; 361/1; 361/23; 361/89; 318/432; 318/434; 417/45; 323/267
(58) Field of Classification Search .......... 361/28, 361/23, 1, 89; 417/45; 318/434, 432; 323/267
See application file for complete search history.

(56) References Cited

U.S. PATENT DOCUMENTS

| | | | | | |
|---|---|---|---|---|---|
| 4,422,030 | A | * | 12/1983 | McAllise | 318/779 |
| 4,511,312 | A | * | 4/1985 | Hartwig | 417/45 |
| 4,822,331 | A | * | 4/1989 | Taylor | 494/16 |
| 5,077,512 | A | * | 12/1991 | Weber | 318/776 |
| 5,280,227 | A | * | 1/1994 | Bashark | 318/751 |
| 5,345,126 | A | * | 9/1994 | Bunch | 310/68 C |
| 5,808,441 | A | * | 9/1998 | Nehring | 318/751 |
| 6,756,756 | B1 | * | 6/2004 | Chmiel et al. | 318/430 |
| 2003/0206804 | A1 | * | 11/2003 | Smith | 417/44.1 |

* cited by examiner

*Primary Examiner*—Rita Leykin
(74) *Attorney, Agent, or Firm*—Alan Kamrath; Kamrath & Associates PA

(57) ABSTRACT

A protective device for a controlling system of a sewage pump has a protective circuit to protect a start capacitor and to avoid the start capacitor from burnout when an overload is occurred by actuating power source (ON status) or a transient voltage is occurred by malfunction of a controlling circuit. Therefore, the start capacitor is certainly protected and significantly improved in lifespan.

2 Claims, 4 Drawing Sheets

PROTECTIVE DEVICE FOR A CONTROLLING SYSTEM OF A SEWAGE PUMP

BACKGROUND OF THE INVENTION

1. Field of the Invention

The present invention relates to a protective device for a controlling system of a sewage pump, and more particularly to a protective device that controls pump operation and has a protective circuit protecting a start capacitor in the controlling system to avoid the start capacitor from burnout when an overload is occurred by actuating power source (ON status) or when a transient voltage is occurred by malfunction of a controlling circuit.

2. Description of Related Art

A conventional sewage pump system in accordance with the prior art as shown in FIGS. 1 and 2 has an operational controlling circuit system 2 for controlling the operation of a sewage pump 1. The operational controlling circuit system 2 has a start capacitor 21 connected with a run capacitor 22 in parallel connection and a centrifugal switch 3 in series connection and further connected with an actuating coil 11 and an operating coil 12 to perform a combined circuit. In the operational controlling circuit system 2, the actuating coil 11 and the operating coil 12 drive the sewage pump 1 to function when the electrical power is supplied. The centrifugal switch 3 mounted on a shaft 4 of the sewage pump 1 is changed from a normal closed (N.C.) status to a normal open (N.O.) status because the centrifugal force caused by the rotation of the shaft 4 so that the start capacitor 21 is interrupted by discharging movement and stops immediately to protect itself from burnout during long-term operation period. However, the centrifugal switch 3 is usually malfunctioned and thus kept the normal closed (N.C.) status because the carbon accumulation or oxidation caused by sparkles at contacts when a large current is occurred. Therefore, disengagement movement of the centrifugal switch 3 can not be completed and the start capacitor 21 is kept to contact with the power source and to discharge electricity until burnout. Moreover, the actuating coil 11 and the operating coil 12 of the sewage pump are consequently burnt.

According to above description, the conventional sewage pump system still has some drawbacks in use.

SUMMARY OF THE INVENTION

A main objective of the present invention is to provide a protective device for a controlling system of a sewage pump, wherein the protective device protects a start capacitor from keeping discharge and burnout when a centrifugal switch is abnormally suspended at a normal closed (N.C.) status caused by carbon-deposition situation or oxidation at contacts because of sparkles generated by large current.

To achieve the foregoing objective, the protective device comprises:

a protective device for a controlling system of a sewage pump with a start capacitor and a run capacitor, the protective device comprising a protective circuit composed of a centrifugal switch adapted to mount on an output shaft of the sewage pump and a delay-type relay connected to the centrifugal switch in series connection and providing a protective efficiency by cutting power to avoid the start capacitor of the sewage pump from burnout caused by transient voltage when overload is occurred at actuating moment or when a controlling circuit is malfunctioned.

By having the protective circuit, the centrifugal switch and the delay-type relay both enable to switch to selectively connect to the N.O. and N.C. contacts for double secure protection, the start capacitor is protected to have extended lifespan.

Further benefits and advantages of the present invention will become apparent after a careful reading of the detailed description with appropriate reference to the accompanying drawings.

DETAILED DESCRIPTION OF THE PREFERRED EMBODIMENT

A protective device for a controlling system of a sewage pump in accordance with the present invention has a protective circuit to protect a start capacitor and to avoid the start capacitor from burnout when an overload is occurred by actuating power source (ON status) or a transient voltage is occurred by malfunction of a controlling circuit. Therefore, the start capacitor is certainly protected and significantly improved in lifespan.

Figure 1:
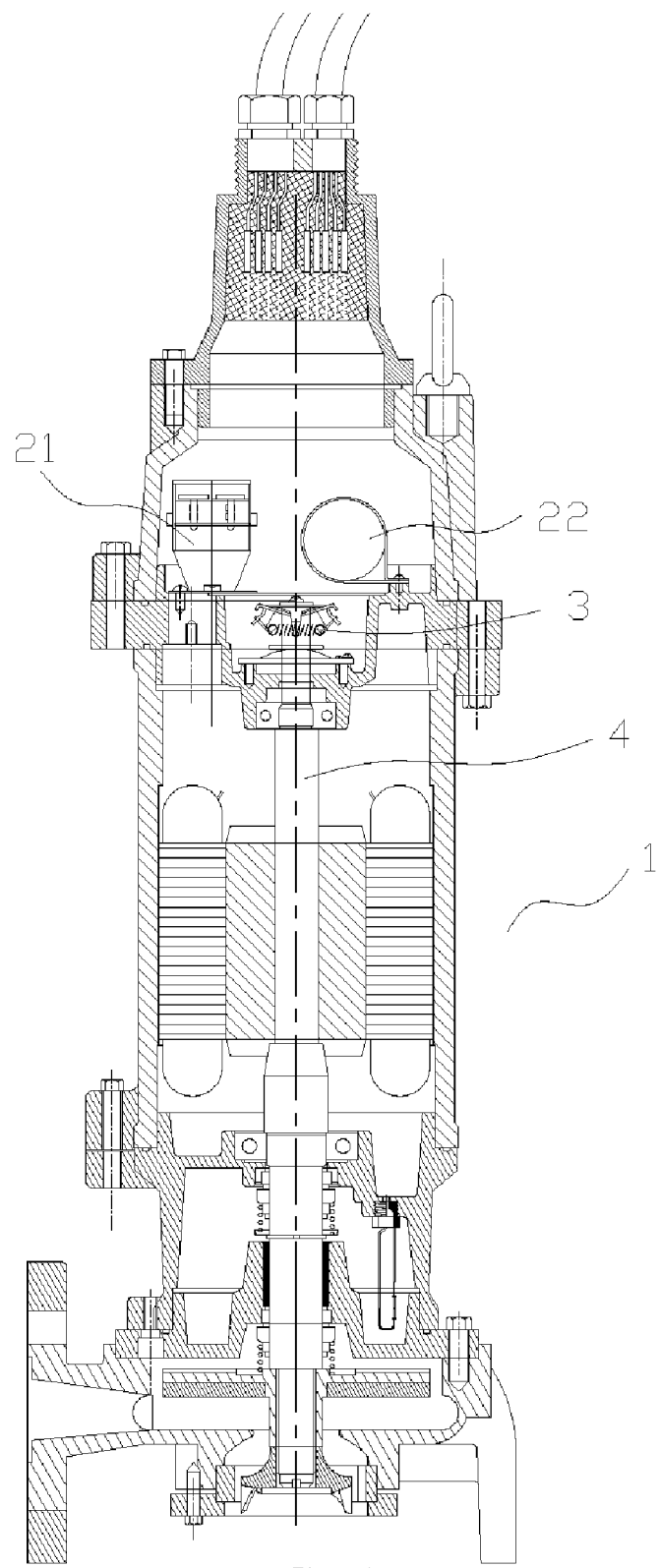
FIG. 1 is a cross-sectional view of a conventional sewage pump system in accordance with the prior art.
Figure 2:
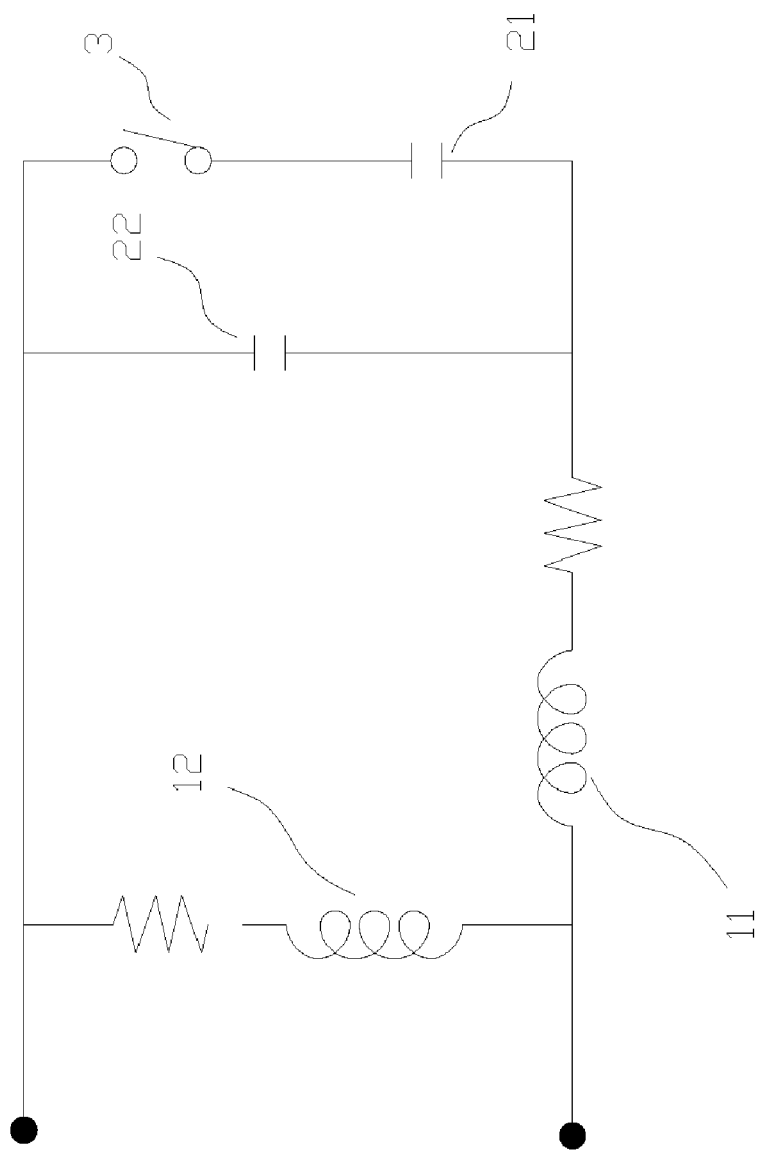
FIG. 2 is a schematic circuit diagram for the sewage pump system in accordance with the prior art.
Figure 3:
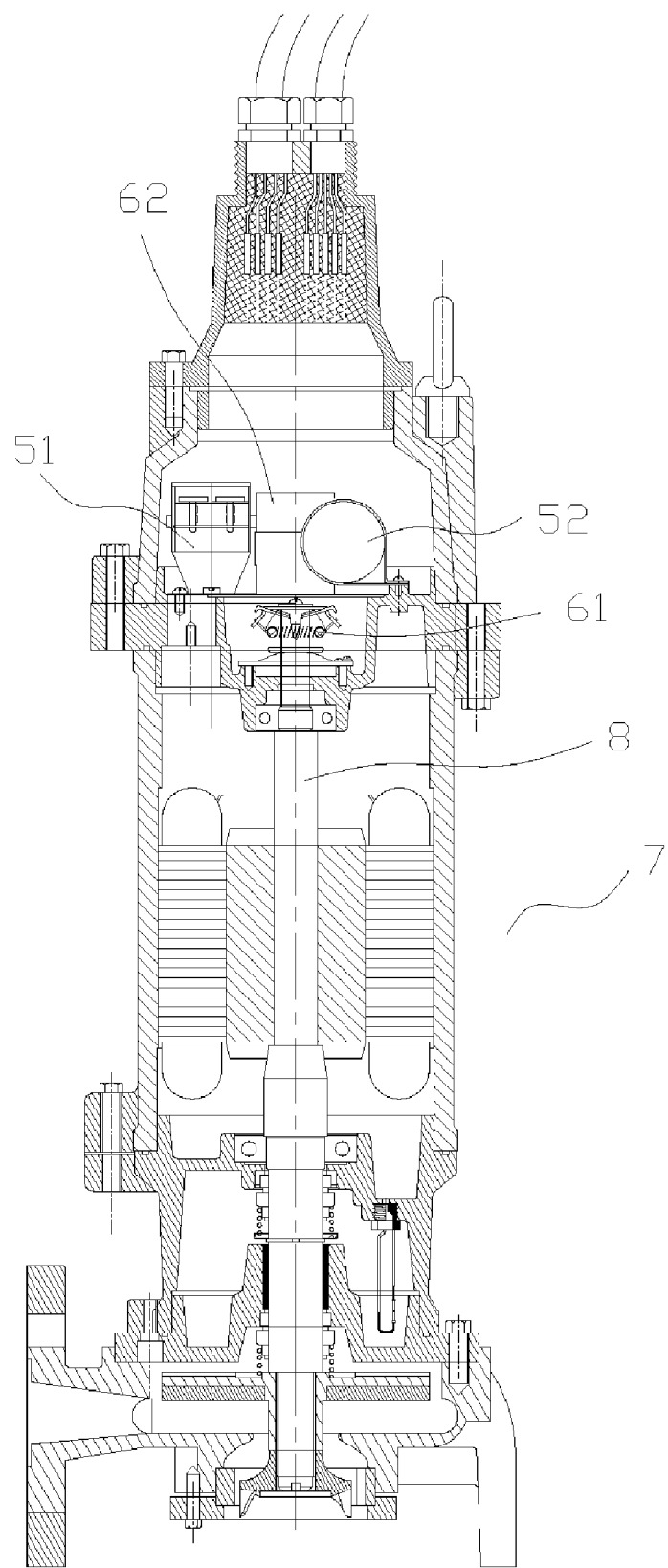
FIG. 3 is a cross-sectional view of a sewage pump system with a protective device in accordance with the present invention.
Figure 4:
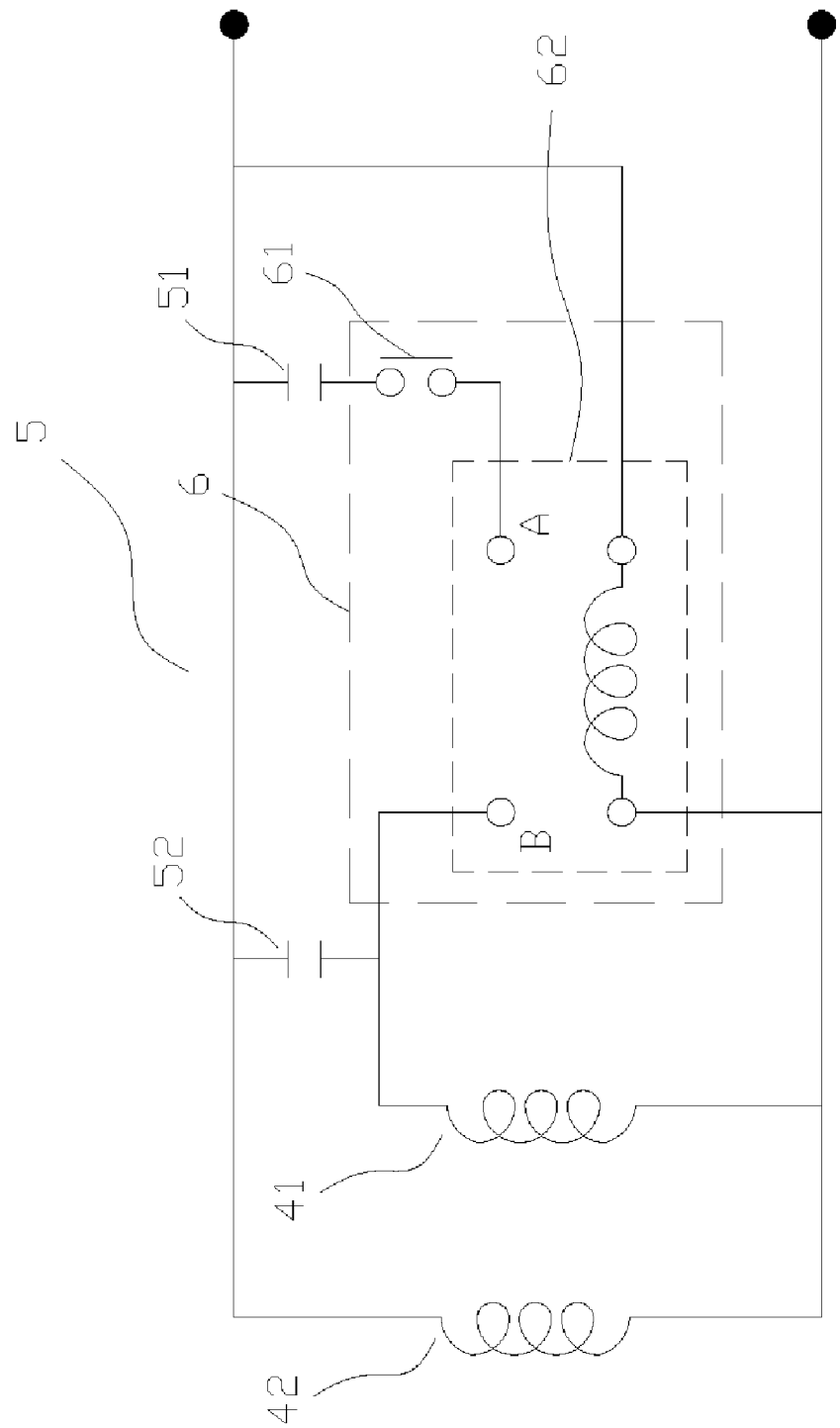
FIG. 4 is a schematic circuit diagram for the sewage pump system with the protective device in the present invention.

The protective device for a controlling system of a sewage pump is applied to an operation-controlling circuit system 5 to drive a sewage pump 4 as shown in FIG. 1, wherein the operation-controlling circuit system 5 has a start capacitor 51 and a run capacitor 52. The protective device 6 is combined with the operation-controlling circuit system 5 as shown in FIG. 4 and has a protective circuit composed of a centrifugal switch 61 and a delay-type relay 62 in a series connection arrangement. The centrifugal switch 61 is mounted on an output shaft of the sewage pump 4 and has one end connected to a contact (A) of the delay-type relay 62 in series connection and another end connected to the start capacitor 51 in series connection. The run capacitor 52 is connected to a contact (B) of the delay-type relay 62 in series connection. The start capacitor 51 and the run capacitor 52 respectively have one end connected to an actuating coil 41 and an operating coil 42 of the sewage pump 4 to perform a combined circuit. When the power source is not available, the delay-type relay 62 and the contact of the centrifugal switch 61 are in N.C. status. When the power source is applied, the centrifugal switch 61 is actuated at operation timing that the rotation speed is 75%. The start capacitor 51 is actuated by disengagement (one contact of the centrifugal switch) when 75% set rotation speed is achieved and meanwhile the sewage pump 4 operates when the actuating coil 41 and the operating coil 42 are applied with an efficient voltage to drive the sewage pump 4. Then, the delay-type relay 62 procrastinates to change the N.C. contact to N.O. contact and then the centrifugal switch 61 is changed to an N.O. status by a centrifugal force caused by 75% set rotation speed to make the start capacitor 51 disengaged in an open status. Because two ends of the start capacitor 51 still have charging voltages, the N.C. contact of the delay-type relay 62 protects the start capacitor 51 from being further charged and burnout then. Because when the sewage pump 4 suffers increased load, rotation speed is decreased so that the centrifugal switch 61 is changed from N.O. contact status to N.C. contact status. However, the delay-type relay 62 still works to change from N.C. contact status to N.O. contact status at the same time to stop the start capacitor 51 to be further charged and to avoid malfunction. Additionally, when the sewage pump 4 can not be actuated or the centrifugal switch 61 can not be switched from N.C. status to N.O. status, the relayed-type relay 62 can perform the protective action from N.C. status to N.O. status in substitute to isolate (open) the start capacitor 51 and to protect the start capacitor 51.

According to above description, the protective device for a controlling system of a sewage pump has the following advantages:

1. The centrifugal switch in the protective device is a mechanical centrifugal switch but might cause burnout of the start capacitor when it is overloaded at actuating moment or the contacts can not disengage to switch. However, the delay-type relay can cut the power source to prevent the start capacitor from burnout (the centrifugal switch and the delayed-relay are in series connection).

2. The delayed relay has a shorter response time to change from N.C. status to N.O. status than that of the centrifugal switch so that the large or overload current is retarded or absorbed by the delay-type relay because the delay-type relay is hermetical to avoid oxidation of the centrifugal switch and thus to eliminate problem of unable to disengage or to contact well.

Although this invention has been described in its preferred form with a certain degree of particularity, it is understood that the present invention of the preferred form has been made only by way of example and that numerous changes in the details of construction and the combination and arrangement of parts any be resorted to without departing from the spirit and scope of the invention.

What is claimed is:

1. A protective device for a controlling system of a sewage pump with a start capacitor and a run capacitor, the protective device comprising a protective circuit composed of a centrifugal switch adapted to mount on an output shaft of the sewage pump and a delay-type relay connected to the centrifugal switch in series connection and providing a protective efficiency by cutting power to avoid the start capacitor in the sewage pump from burnout caused by transient voltage when an overload is occurred at actuating moment or when a controlling circuit is malfunctioned.

2. The protective device as claimed in claim 1, wherein one end of the centrifugal switch is connected to a contact (A) of the delay-type relay; another end of the centrifugal switch is adapted to connect to the start capacitor; and a contact (B) of the delay-type relay is adapted to connect to the run capacitor; wherein, the start capacitor and the run capacitor are operationally and respectively connected to an actuating coil and an operating coil to achieve a combined circuit for the operation of the sewage pump.

\* \* \* \* \*